(12) United States Patent
Goodman et al.

(10) Patent No.: US 6,381,382 B2
(45) Date of Patent: *Apr. 30, 2002

(54) DYNAMIC MULTICHANNEL FIBER OPTIC SWITCH

(75) Inventors: Albert Goodman; Mohsen Shahinpoor, both of Albuquerque, NM (US)

(73) Assignee: Wizard Technologies, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/733,309

(22) Filed: Dec. 8, 2000

Related U.S. Application Data

(63) Continuation-in-part of application No. 09/513,663, filed on Feb. 25, 2000, now Pat. No. 6,181,844, and a continuation-in-part of application No. 09/513,657, filed on Feb. 25, 2000, now Pat. No. 6,192,171.

(51) Int. Cl.[7] .................................................. G02B 6/26
(52) U.S. Cl. ........................... 385/22; 385/16; 385/17; 385/18; 385/52; 385/90
(58) Field of Search ..................... 385/16–24, 40, 385/8, 33–35, 50, 52, 90

(56) References Cited

U.S. PATENT DOCUMENTS

| | | | |
|---|---|---|---|
| 4,152,043 A | 5/1979 | Albanese | 350/96.2 |
| 4,204,742 A | 5/1980 | Johnson et al. | 350/96.2 |
| 4,204,744 A | 5/1980 | Wittmann | 350/96.2 |
| 4,303,302 A * | 12/1981 | Ramsey et al. | 350/96.2 |
| 4,415,228 A | 11/1983 | Stanley | 350/96.2 |
| 4,512,036 A | 4/1985 | Laor | 455/612 |
| 4,512,627 A | 4/1985 | Archer et al. | 350/96.2 |
| 4,543,663 A | 9/1985 | Laor | 455/600 |
| 4,580,292 A | 4/1986 | Laor | 455/607 |
| 4,651,343 A | 3/1987 | Laor | 455/600 |
| 4,652,081 A | 3/1987 | Fatatry | 350/96.2 |
| 4,657,339 A * | 4/1987 | Fick | 385/16 |
| 4,759,597 A | 7/1988 | Lemonde | 350/96.2 |
| 4,790,624 A | 12/1988 | Van Hoye et al. | 350/96.26 |
| 4,844,577 A | 7/1989 | Ninnis et al. | 350/96.29 |
| 4,886,335 A | 12/1989 | Yanagawa et al. | 350/96.2 |
| 4,969,709 A | 11/1990 | Sogawa et al. | 350/96.26 |
| 5,004,318 A | 4/1991 | Ohashi | 350/96.2 |
| 5,024,497 A | 6/1991 | Jebens | 350/96.2 |
| 5,175,776 A * | 12/1992 | Lee | 385/16 |

(List continued on next page.)

FOREIGN PATENT DOCUMENTS

DE     3338051 A1     2/1985

OTHER PUBLICATIONS

Shahinpoor, M. et al. "Ionic Polymer–Metal Composites (IPMCs) as Biomimetric Sensors, Acututors and Artificial Muscles—A Review" Smart Mater. Struct. 7 (1998) R15–R30.

*Primary Examiner*—Hemang Sanghavi
(74) *Attorney, Agent, or Firm*—Andrea L. Mays; Deborah A. Peacock; Jeffrey D. Myers

(57) ABSTRACT

An apparatus and method of optical switching wherein a plurality of individual activation strips (18) are adhered longitudinally upon an optical channel, such as an optical fiber (14) to cause the fiber to undulate in 2½ dimensions when the activation strips are activated. The activation strips are activated with a constant or varying electrical source and are located at the free end of the optical fiber. Contraction and expansion of respective activation strips causes a free end of the optical fiber to be displaced or to undulate. A multichannel switch (100) operates by moving the free end of the selected input fiber and the free end of the selected output fiber toward one another so that the signal is sent from the input to the output fiber.

29 Claims, 11 Drawing Sheets

U.S. PATENT DOCUMENTS

| | | | |
|---|---|---|---|
| 5,214,727 A | 5/1993 | Carr et al. | 385/22 |
| 5,216,729 A | 6/1993 | Berger et al. | 385/31 |
| 5,261,015 A | 11/1993 | Glasheen | 385/23 |
| 5,524,153 A | 6/1996 | Laor | 385/16 |
| 5,647,033 A | 7/1997 | Laughlin | 385/16 |
| 5,699,463 A | 12/1997 | Yang et al. | 385/22 |
| 5,781,672 A | 7/1998 | Cutts | 385/22 |
| 5,808,472 A | 9/1998 | Hayes | 324/671 |
| 5,812,711 A | 9/1998 | Glass et al. | 385/37 |
| 5,841,912 A | 11/1998 | Mueller-Fiedler et al. | 385/7 |
| 5,870,518 A | 2/1999 | Haake et al. | 385/90 |
| 5,915,063 A | 6/1999 | Colbourne et al. | 385/140 |
| 6,044,186 A * | 3/2000 | Chang et al. | 385/23 |
| 6,181,844 B1 * | 1/2001 | Goodman et al. | 385/16 |
| 6,192,171 B1 * | 2/2001 | Goodman et al. | 385/16 |

* cited by examiner

DYNAMIC MULTICHANNEL FIBER OPTIC SWITCH

CROSS-REFERENCE TO RELATED APPLICATIONS

This application is a continuation-in-part application of both U.S. patent application Ser. No. 09/513,663, entitled "Dynamic Fiber Optic Switch", to Albert Goodman, filed on Feb. 25, 2000, now U.S. Pat. No. 6,181,844 and U.S. patent application Ser. No. 09/513,657, entitled "Dynamic Fiber Optic Switch with Artificial Muscle", to Albert Goodman and Mohsen Shahinpoor, filed on Feb. 25, 2000, now U.S. Pat. No. 6,192,171 and the specifications thereof are incorporated herein by reference.

BACKGROUND OF THE INVENTION

1. Field of the Invention (Technical Field)

The present invention relates to fiber optic switches, particularly the use of electro- or magneto-active materials to cause optical fibers to undulate.

2. Background Art:

Present day optical fiber technologies are revolutionizing the telecommunications industry. Tremendous advances have been made in the field of telecommunications over the past decade. It has been estimated that this technology is capable of carrying tens of millions of conversations simultaneously on a single optical fiber. Optical fiber communication systems offer many advantages over systems that use copper wire or radio frequency links as a transmission medium. They include lower transmission losses, higher bandwidths, higher transmission rates, lower implementation costs, greater reliability and greater electrical isolation characteristics. It is clear that optical fiber communication will dominate the telecommunications industry in the very near future because of advantages such as these.

An important task in any fiber optics telecommunication system is routing the transmitted data to the proper destination from among many destinations possible. This task is accomplished by a variety of fiber optics switches. As the use of fiber optics has proliferated in telecommunication systems, replacing wire, different routing fiber optic switches have been developed. They generally consist of only a few or several fiber optics channels.

Fiber optic switching is an important component in any telecommunication system. These systems use switches to establish communication channels among two or more of their interfaces. An optical fiber switch is capable of optically connecting, or aligning, any one of a first group of optical fibers with any one of a second group of optical fibers, or vice versa, enabling an optical signal to propagate through the optical interface junction from one fiber to the other.

When two optical fibers are aligned end-to-end, light entering one fiber (the input or sending fiber) will continue into and through the second fiber (the output or receiving fiber) while the two adjacent ends, or faces, are aligned and close together. Fiber optic switches misalign or disjoin the adjacent ends of the fibers by moving one or both of the two ends. By moving, for example, the first fiber's end to a new location, the signal, in this case light, can be redirected into another, third fiber, by aligning the first fiber's end with an end of the third fiber.

Lateral separation of the two adjacent ends will result in loss of light between the two fibers so that a light absorber is provided beside the fiber which either moves into place as the receiving fiber moves away or stays in place as the sending fiber moves away. Space is provided for this motion. This effectively switches the signal off. The discontinuity between the fiber ends may be either perpendicular to the fiber axis or at some angle to the axis but the gap is minimal when the fibers are aligned. Fibers may be collected into a bundle, a fiber optic cable, with a structure set up at the active location to permit the required motion of a fiber end. A fiber bundle can be separated from a circular bundle or other shaped cross-section to a linear arrangement where the fibers are in a straight line at the switch but reformed into a bundle again at the device exit.

Optical fiber switches generally utilize fiber positioning means, alignment signal emitter means and computer control means. Normally, a fiber positioning means is provided near the end of one fiber to selectively point the end of that fiber in one fiber group toward the end of another fiber in the other fiber group to perform a switched optical transmission. Patents proposing to perform such switching actions in fiber optic telecommunication systems include: U.S. Pat. No. 5,024,497, to Jebens, entitled "Shape Memory Alloy Optical Fiber Switch," which discusses switching activated by a shape memory alloy wire in a transverse direction. U.S. Pat. No. 4,512,036, entitled "Piezoelectric Apparatus for Positioning Optical Fibers," U.S. Pat. No. 4,543,663, entitled "Piezoelectric Apparatus for Positioning Optical Fibers," U.S. Pat. No. 4,651,343, entitled "Piezoelectric Apparatus for Positioning Optical Fibers," and U.S. Pat. No. 5,524,153, entitled "Optical Fiber Switching System and Method Using Same," all to Laor, use piezoelectric bimorphs for positioning optical fiber switches. U.S. Pat. No. 4,303,302, to Ramsey, et al., entitled "Piezoelectric Optical Switch" discusses other forms of piezoelectric bimorphs for optical fiber switching.

Patents discussing fiber optic switching include: U.S. Pat. No. 5,812,711, to Glass, et al., entitled "Magnetostrictively Tunable Optical Fiber Gratings;" U.S. Pat. No. 5,812,711 to Malcolm, et al., entitled "Magnetostrictive Tunable Optical-Fiber Gratings;" U.S. Pat. No. 4,759,597, to Lamonde, entitled "Mechanical Switch for Optical Fibers;" U.S. Pat. No. 4,415,228, to Stanley, entitled "Optical Fiber Switch Apparatus;" U.S. Pat. No. 5,004,318, to Ohashi, entitled "Small Optical Fiber Switch;" U.S. Pat. No. 4,844,577, to Ninnis, et al, entitled "Bimorph Electro Optic Light Modulator;" U.S. Pat. No. 4,512,627, to Archer, et al., entitled "Optical Fiber Switch, Electromagnetic Actuating Apparatus with Permanent Magnet Latch Control;" U.S. Pat. No. 5,699,463, to Yang, et al., entitled "Mechanical Fiber Optic Switch;" U.S. Pat. No. 5,841,912, to Mueller-Fiedler, entitled "Optical Switching Device;" U.S. Pat. No. 5,647,033, to Laughlin entitled "Apparatus for Switching Optical Signals and Method of Operation;" U.S. Pat. No. 4,886,335, to Yanagawa, et al., entitled "Optical Fiber Switch System;" and U.S. Pat. No. 4,223,978, to Kummer, et al., entitled "Mechanical Optical Fiber Switching Device." These patents disclose various methods for fiber optic switching, including mechanical devices such as rods, motors, and adapters, as well as wave guides and reflectors. The Ohashi, Ramsey, Ninnis, Stanley, Jebens, Glass, and Laor patents disclose various methods and apparatuses that use piezoelectrics, magneto-strictive materials, and shape memory alloys, for bending the fiber; however, these patents are either complicated in their configurations or require additional mechanical means beyond these materials.

Other issued patents that disclose types of fiber optic switches include U.S. Pat. No. 5,915,063 to Colbourne, et al., entitled "Variable Optical Attenuator" which discloses the use of a mirror that tilts in response to movement of a piezoelectric member, or magnetostrictive or eletrostrictive elements. The signal leaves one of the fibers and reflects off of the mirror which directs the signal into the other fiber depending on the tilt of the mirror. U.S. Pat. No. 5,808,472 to Hayes, entitled "Apparatus and Methods for Positioning Optical Fibers and Other Resilient Members" discloses positioning the free end of an optical fiber in the electric field of several electrodes and applying voltage to a conductive sleeve around the fiber which then responds to the electric field produced by the electrodes. U.S. Pat. No. 4,580,292 to Laor, entitled "Communications Exchange" discloses the use of a bender element like the bender element disclosed in the above identified Laor patents, that is actuated by piezoelectrics. The free end of the optical fiber is attached to the bender element so that it can be moved by the bender element.

U.S. Pat. No. 5,870,518 to Haake, et al., entitled "Microactuator for Precisely Aligning an Optical Fiber and an Associated Fabrication Method" positions actuators in a complicated substrate apparatus for controlling the movement of an optical fiber. U.S. Pat. No. 5,216,729 to Berger, et al., entitled "Active Alignment System for Laser to Fiber Coupling" uses piezoelectric elements to control mirrors which direct a laser beam into an optical fiber, and piezoelectric transducers made up of vertical and horizontal elements that move in response to an applied voltage and thereby move the fiber. U.S. U.S Pat. No. 5,214,727 to Carr, et al., entitled "Electrostatic Microactuator" discloses a microactuator for moving an optical fiber into alignment with one of several optical fibers by means of upper and lower substrates and a series of electrodes on the substrates which provide upper and lower torque stators. The fiber is moved by a conductive armature that responds to energy from the electrodes. U.S. Pat. No. 4,652,081 to Fatatry, entitled "Optical Multi-Fibre Switch" discloses coating a magnetic material on a fiber that causes the fiber to move in response to an energized solenoid around the fiber. U.S. Pat. No. 4,223,978 to Kummer, et al., entitled "Mechanical Optical Fiber Switching Device" discloses a mechanical switch for aligning and misaligning optical fibers.

As fiber optics telecommunication increases in application, the number of channels required for switching systems will multiply greatly. A switch that can accommodate dozens or even hundreds of channels will be valuable and effective. Designs based upon combinations of numerous small, movable mirrors and lenses to direct light from individual fixed fibers have been under development for some years by such organizations as Nortel Networks, and Lucent Technologies.

The present invention overcomes deficiencies in the prior art and simplifies optical switching by largely eliminating the mechanical structure necessary to move the fibers. The present invention provides movement of fiber optic channels by directly adhering an electro- or magneto-active material to the optical fiber itself, longitudinally to cause the fiber to undulate to the desired "2½-D" position. The fiber moves by application of an electrical signal directly to the electro- or magneto-active material upon the fiber. The designation "2½-D" used herein signifies that the displacement of the fiber may be both laterally and longitudinally. The present invention, being based on modifications of the inventions in the parent applications, allows input and output fibers to undulate in 2½ dimensions and accommodates a large number of optical channels without the use of complicated apparatuses or multiple movable mirrors.

SUMMARY OF THE INVENTION (DISCLOSURE OF THE INVENTION)

The present invention is an optical switch wherein an activation material is adhered on individual optical channels so that when an electrical signal is applied to the activation material, the activation material contracts or expands and moves the optical channel accordingly. The activation material can consist of either an magneto-strictive material, a piezoelectric material, a piezoceramic material, a piezopolymeric material, a shape-memory alloy material, or an artificial muscle material. The activation material is adhered longitudinally upon the free end of the optical channels in the form of activation strips or in the form of a jacket. Alternatively, three or four piezoelectric bimorph activation elements may be adhered to individual fibers so as to cause undulation motion in the various directions required. The electrical signal that is applied to the activation material can vary in amplitude, frequency or polarity in order to control the direction and amount of movement of the optical channel, as well as the frequency of its movement.

The activation strips or jacket of activation material is placed on either or both of the input and output optical channels. In this manner, either or both the input and the output optical channels to be aligned can move toward one another so that the emitted signal from the input optical channel is transmitted into the receiving face of the selected output optical channel upon activation of the activation material. Collimating lenses are provided on either or both of the input and output optical channels sending and receiving faces to focus the emitted signal into the selected output channel.

In the situation where the input and output optical channels are not arranged in an end-to-end fashion, a fixed mirror is used to reflect the emitted signal from the input channels toward the output channels. Additionally, the present invention includes a support frame for the input channels and a support frame for the output channels. The support frame defines a plurality of openings for each individual optical channel to fit through so that the optical channel is held stable while allowing the free end to undulate. The support frame is located just behind the activation material of each optical channel so that the optical channels are stabilized while still allowing the free ends to undulate. Each opening in the frame is designed in a shape allowing the individual optical channels to move freely in the directions necessary to send and receive the transmitted signal.

A primary object of the present invention is to provide an efficient and versatile means for optical switching by undulating the free ends of both the input and output optical fibers such that the selected input and output fiber move toward one another and the signal is directed from the input fiber into the selected output fiber.

Another object of the present invention is to undulate an optical fiber by placing electro-magneto-active material strips longitudinally along the optical fiber in order to move the optical fiber in 2½ dimensions in response to an electrical signal applied to the strips.

A primary advantage of the present invention is that the fibers move in response to the electrical signals applied to the electro- or magneto-active materials adhered directly to each fiber, and does not require additional mechanical means to move the fiber.

Still another advantage of the present invention is that each input and output optical fiber can be moved in 2½ dimensions thereby increasing the versatility of the optical switch.

Other potential advantages provided by the present invention, due to its simplicity and design, are long life, reliability, low cost, and a variety of applications.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together With the description, serve to explain the principles of the invention. The drawings are only for the purpose of illustrating a preferred embodiment of the invention and are not to be construed as limiting the invention. In the drawings.

Figure 1:
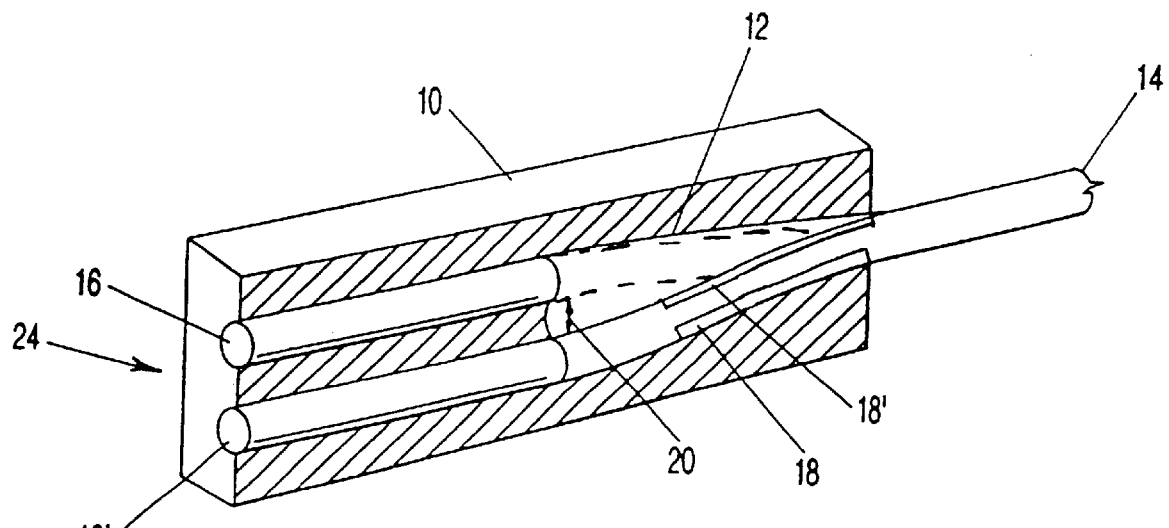
FIG. 1 is a cut-away view of the fiber optic switch of the present invention showing a single input fiber undulating between two output fibers in accordance with the present invention.

DESCRIPTION OF THE PREFERRED
EMBODIMENTS (BEST MODES FOR
CARRYING OUT THE INVENTION)

The present invention is a novel method and apparatus for optical fiber switching which is based on adhering as part of the body of the fiber itself, electro- or magneto-active means in the form of wires, and/or strips, or a jacket adhered longitudinally to the fiber itself to quickly undulate the end of a given optical fiber, from one group of fibers, to align with another optical fiber, from another group of optical fibers, in a telecommunication system. It is to be understood that the word undulating, including other tenses and forms of that word, are herein used to mean displacement and undulation of the fiber or fibers. The present invention can either displace a fiber to a new position or cause the fiber to undulate back and forth between two or more positions as required in the application of the invention. The present invention accomplishes undulation in "2½-D." In other words, the end of the optical fiber to be moved is moved in both the x-axis and y-axis directions, as well as somewhat in the z-axis direction necessarily due to the bending of the fiber. The electro- or magneto-active means include smart materials such as shape-memory alloys or polymer strips or wires, piezoelectric (piezoceramics, piezopolymers, etc.,) strips, magneto-strictive strips, and electro- or magneto-active polymers such as ionic polymeric conductive composites (artificial muscles). These and other electro- or magneto-active means are referred to herein as "activation strips."

The activation strip is extended longitudinally along and adhered to an optical channel, be it an optical fiber, a group of fibers, or a fiber optic cable, as well as any type of signal transmitting channel. The activation strip can be attached by cement, epoxy or glue between the activation strip and the fiber. Other bonding materials may also be used.

The present invention either switches an optical signal on or off, or directs an optical signal from one fiber to another by moving the respective fibers toward or away from one another. It is to be understood that while the sending fibers are generally referred to herein as "input" fibers and those receiving the signal therefrom are "output" fibers, the signal can of course travel in the opposite direction so that the output fiber or fibers become the input fiber or fibers and vice versa. The labels input and output are merely used for ease of reference.

The switch provides on-off action by displacing the input and output fibers by at least a complete fiber diameter. A partial light intensity change may be accomplished by a controlled displacement distance. A diagonal slice arrangement between the ends of the input and output fibers will permit an intensity variation dependent upon separation of the two faces of the input and output fibers. Redirecting the optical signal is accomplished by undulating the end of the input fiber until it is aligned with the appropriate output fiber or vice versa. Then, by having the faces of the ends of the input and output fiber to be joined, cut at diagonals to "fit" each other like two pieces in a puzzle, it allows the input fiber to "snap" into place against the receiving end of the output fiber and be more easily held there.

The displacement of each fiber is accomplished by the activation strips adhered longitudinally to the fiber near the free end where displacement or alignment is needed. Attention is now turned to the figures. The figures present examples of what can be accomplished in accordance with the present invention.

FIG. 1 shows fiber optic switch 10 having input fiber 14 and output fibers 16 and 16'. Channel guide 12 provides space in which input fiber 14 can undulate. Input fiber 14 undulates in the area generally referred to as 20 and aligns with either output fiber 16 or 16', therefore transmitting the signal out of end 24 of switch 10 in the appropriate channel. In this figure, two activation strips 18 and 18' are shown adhered to input fiber 14. The operation of the activation strips is further described below.

Figure 2:
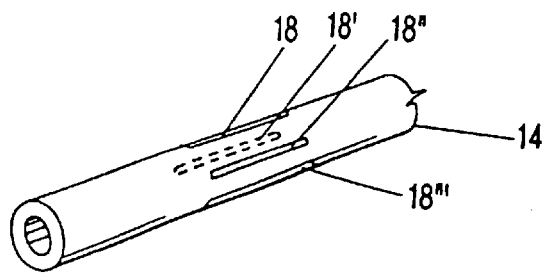
FIG. 2 shows four activation strips adhered to an optical fiber in accordance with the present invention.
Figure 3:
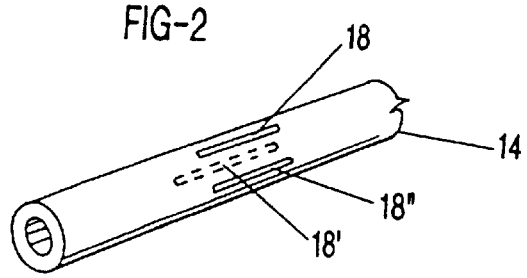
FIG. 3 shows three activation strips adhered to an optical fiber in accordance with the present invention.

FIG. 2 shows input fiber 14 having four activation strips 18, 18', 18", and 18''', adhered along the length of input fiber 14 at radial positions 0°, 90°, 180° and 270° for a fine degree of control. FIG. 3 shows three activation strips 18, 18' and 18" adhered along input fiber 14 at 0°, 120° and 240°. Of course, any number of activation strips, preferably two or more, can be adhered upon input fiber 14 longitudinally at any circumferential location in order to achieve the desired amount of control and fiber movement. While activation strips are shown adhered to an end of the input fiber, the invention is not limited to movement of the input fiber alone, but could of course include moving the output fiber or fibers as well by the same method as will be described further below.

Figure 4:
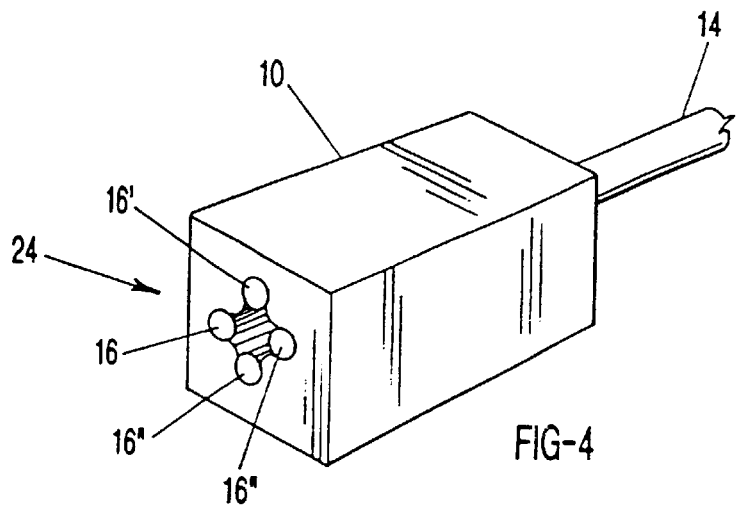
FIG. 4 shows the fiber optic switch having one-fiber input and four-fiber output capability in accordance with the present invention.
Figure 5:
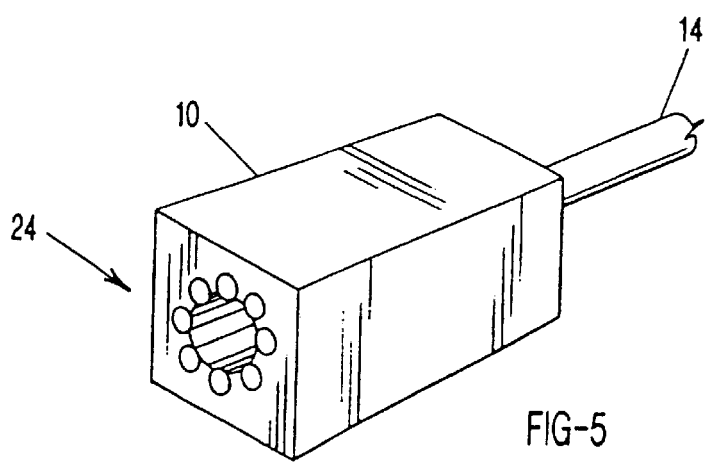
FIG. 5 shows a one fiber input and eight fiber output capability in accordance with the present invention.
Figure 6:
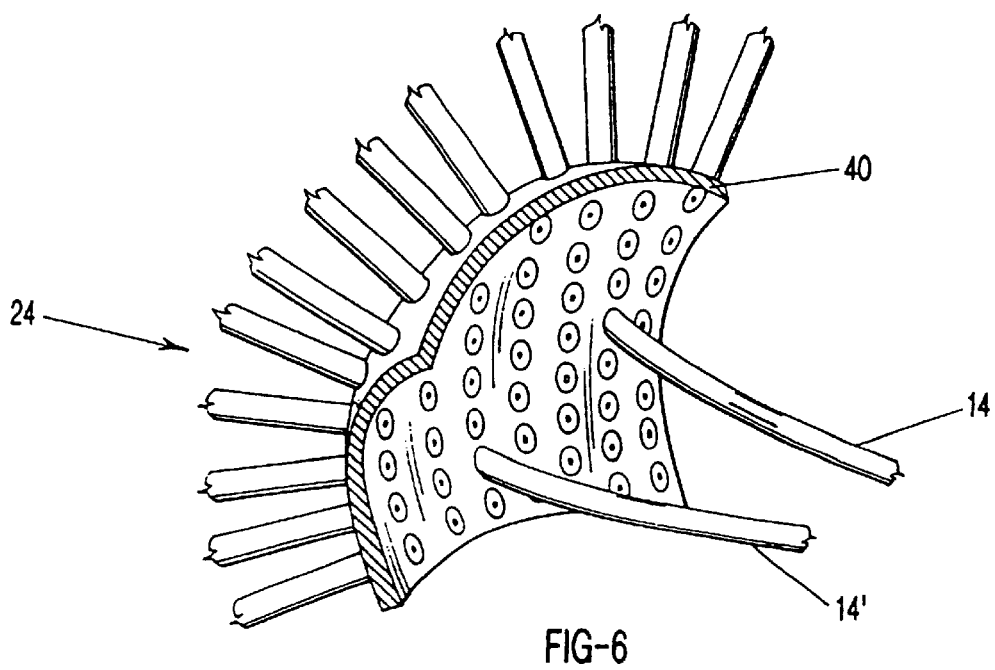
FIG. 6 shows a two fiber input and a spherical segment output having a plurality of fiber outputs in accordance with the present invention.

FIGS. 4 and 5 show fiber optic switch 10 with a single input fiber 14 and a plurality of output fibers to which input fiber 14 can be aligned with and transmit the signal to. FIG. 6 shows an embodiment wherein a spherical segment of output fibers is within the reach of input fibers. Output fibers are fixedly held in the periphery of a hollow sphere 40. Input fibers, such as 14 and 14', are inserted into the hollow sphere 40 and undulate to the appropriate output fiber. Activation strips along the input fibers cause these fibers to move to the desired output fiber location in order to transmit the signal in the appropriate direction. Sphere 40 may be a sphere segment, such as a hemisphere, or any other defined portion of a sphere, provided that the output fibers are arranged spherically about the axis of the input fiber or fibers. Furthermore, as described above regarding the designations "input" and "output," in FIG. 6 fibers 14 and 14' can constitute output fibers while the fibers shown at 24 constitute input fibers and the signal would then travel in the opposite direction.

Figure 7:
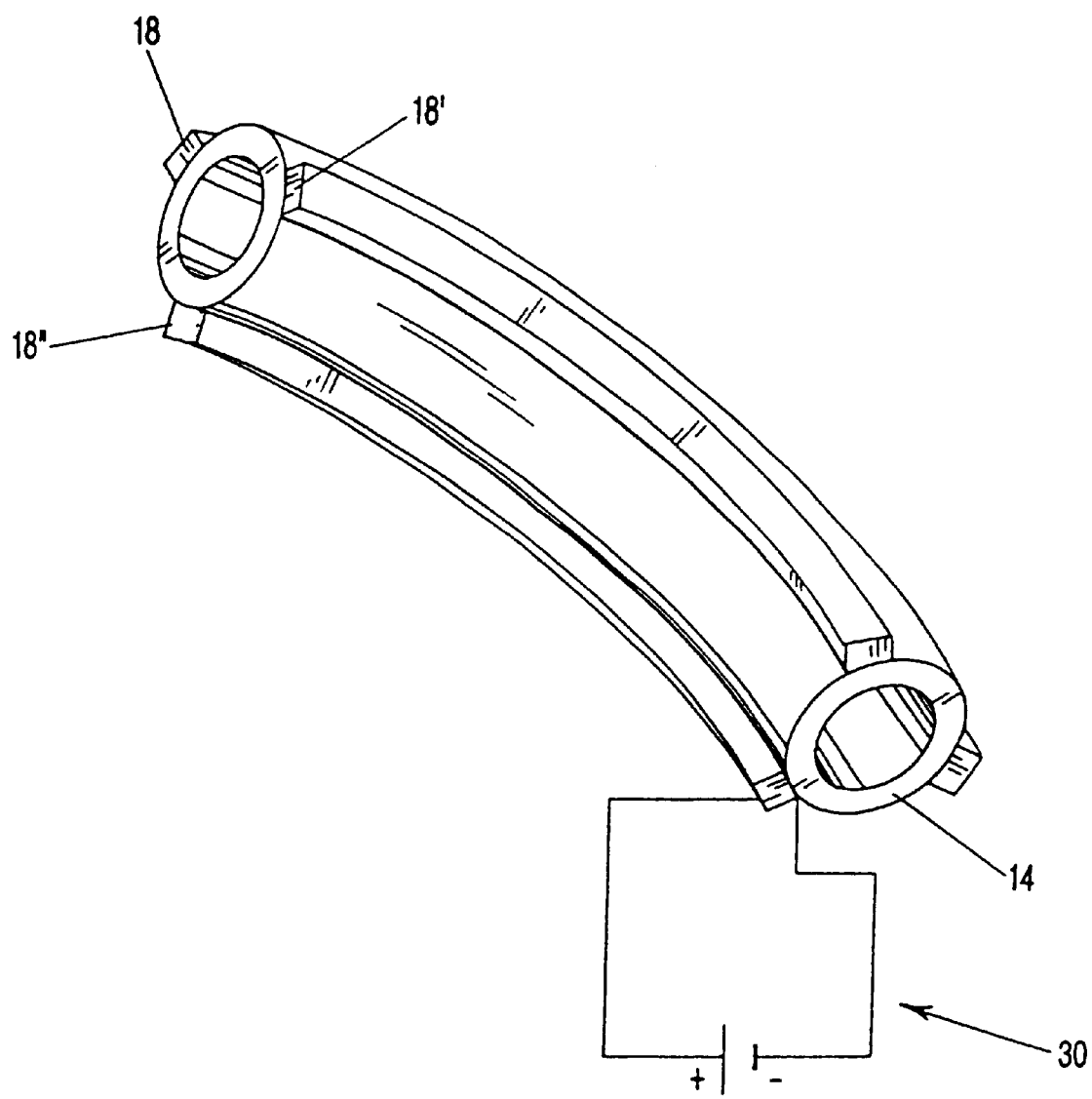
FIG. 7 shows a portion of an optical fiber having three activation strips adhered along the portion of the fiber to be displaced, as well as the voltage supply to one of the activation strips.

FIG. 7 is a blown-up view showing a portion of the fiber to be controlled, whether it be input fiber 14 or any other fiber. Three activation strips are shown adhered along input fiber 14. While voltage source 30 is shown connecting to activation strip 18", it is to be understood that each activation strip requires its own voltage supply for activation. Each activation strip is coated by electrodes to which activation voltages are applied. Electrodes can be either thin metallic or conductive films such as carbon or graphite, or a thin wire connection. These are easily attached by automated manufacturing processes known in the art.

The type of electrical source needed to operate the activation strips depends upon the material used for the activation strips. Piezoelectric materials require a high voltage and low current because they are largely non-conductive. Shape-memory alloys require moderate voltage and current to heat them, generally up to a few tens of volts and up to one or two amps of current. The preferred design voltage for activation is approximately five volts with a maximum current of approximately 400 mA. This is a typical voltage and current compatible with computer voltages for computer and data acquisition system integration. However, the voltages required may be lower depending on the dimension of the fibers to be moved. In general, the smaller the fiber diameter the smaller the voltage required to activate and move the activation strip. Typically, to move a one millimeter diameter fiber approximately two millimetes, approximately two volts of energy is required.

Each activation strip 18 is comprised of an electro- or magneto-active material as will now be described. While only two activation strips are discussed with reference to each embodiment, this is done for simplicity and it is to be understood that the invention requires at least two activation strips and most preferably requires at least three activation strips, such as shown in FIG. 7, for the desired 2½-D control. Either the polarity of the voltage or magnetic field source, or the polarity of the electro- or magneto-strictive material itself can be altered to effect expansion and contraction of the material.

Figures 10A, 10B:
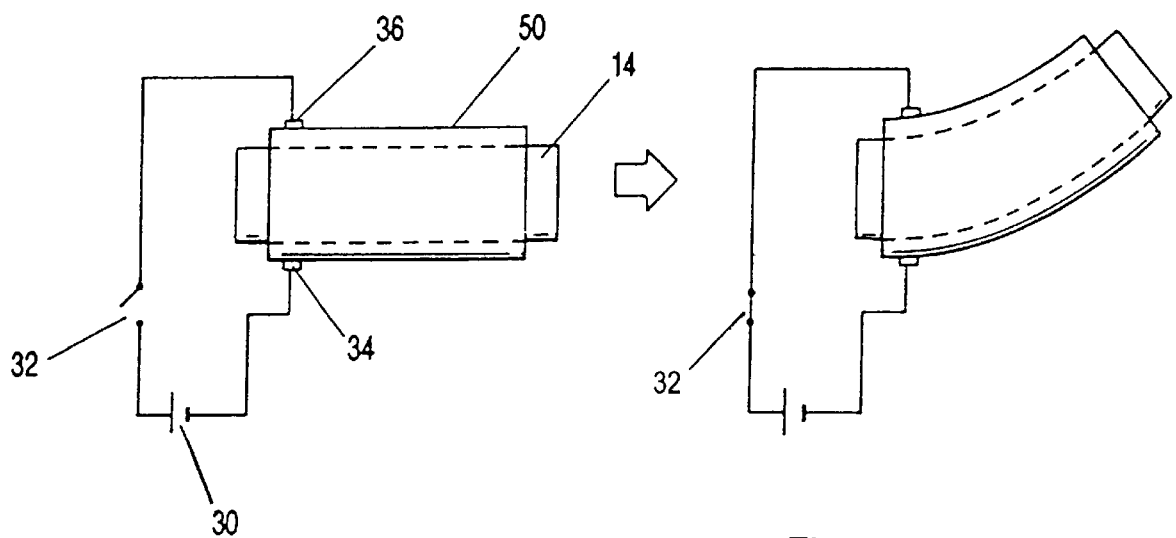
FIGS. 10a and 10b show a side view of an optical fiber surrounded by a magneto-strictive material jacket having two electrodes at one end of the jacket, wherein the jacket is activated by an electrical signal applied to the electrodes, the unactivated state being shown in FIG. 10a and the activated state in FIG. 10b.
Figure 10C:
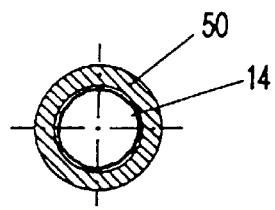
FIG. 10c is a cross-sectional view of the optical fiber with the jacket.

In a first embodiment, a plurality of magneto-strictive strips, such as Terfenol-D, approximately a few centimeters long, for example two centimeters, and of a width of a few microns are adhered in a symmetrical fashion longitudinally to each fiber near the end to be undulated. These activation strips are powered by an imposed magnetic field and either expand or contract according to the polarity of the magnetic field. The magnetic field is normally produced around a magneto-strictive material by a coil arrangement. In this embodiment the coil is attached to or embedded in the activation strip and the coil is powered by a voltage supply connected to each activation strip in the same way as described below for other embodiments. By controlling the magnetic field applied to each individual activation strip, the end of the optical fiber undulates dynamically and quickly to perform the switching function. For example, if two magneto-strictive strips are placed 180 degrees opposite each other longitudinally along the cylindrical mantle of a fiber, then the fiber can be made to move to either the left or the right by concurrently expanding one magneto-strictive strip while contracting the other magneto-strictive strip. The degree of movement to the left or to the right can be controlled by the amount of contraction or expansion of each of the magneto-strictive strips which is directly related to the strength of the magnetic field applied to each strip. Of course, additional magneto-strictive strips are adhered along the length of the fiber for a finer degree of control of movement in 2½-D. Indeed, an entire sleeve or jacket of the material can envelop the fiber and is controlled by a plurality of electrodes upon the jacket. FIGS. 10a and 10b show a side view and FIG. 10c a cross-sectional view, respectively, of this embodiment.

Jacket 50, which is comprised of a magneto-strictive material envelopes optical fiber 14. Electrodes 34 and 36 are powered by voltage supply 30 which is controlled by switch 32. Upon closing switch 32 and applying voltage to electrodes 34 and 36, a magnetic field is produced around jacket 50 by one or more coils embedded in jacket 50 causing jacket 50 to move as shown in FIG. 10b. While only two electrodes are shown for simplicity in these figures, more electrodes and associated coils are used for a finer degree of control of movement. It is to be understood that wherever reference is made herein to displacement of the optical channels via activation strips, the activation "jacket" embodiment is also included as a means of displacing the channels.

Figures 8A, 8B:
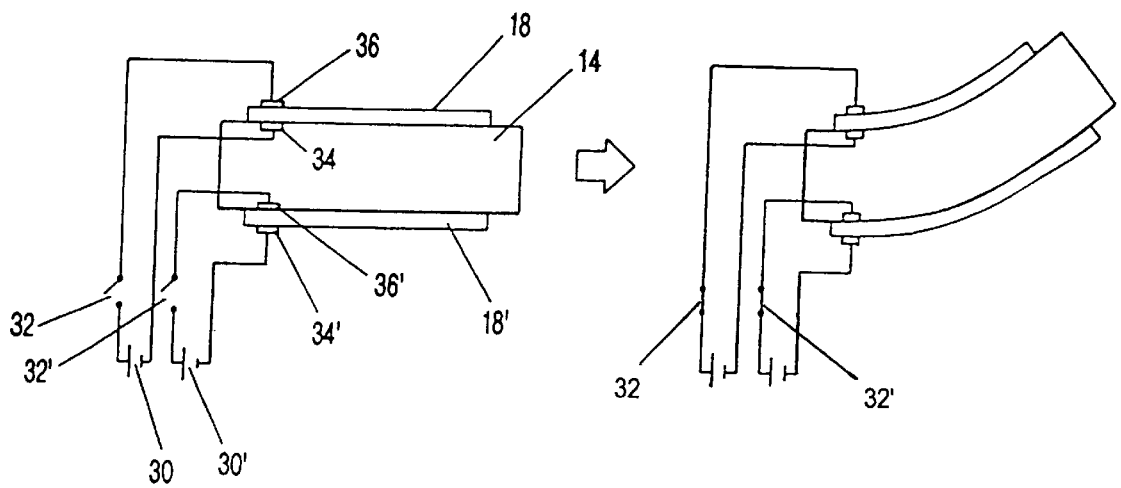
FIGS. 8a and 8b show a side view of an optical fiber with two activation strips, wherein each activation strip is activated by an electrical signal applied to two electrodes located at corresponding ends of each strip, the unactivated state being shown in FIG. 8a and the activated state in FIG. 8b.
Figure 8C:
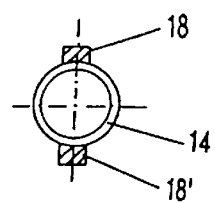
FIG. 8c is a cross-sectional view of the optical fiber with activation strips.

In a second embodiment, a plurality of piezoelectric, piezoceramic, or piezo-polymeric strips, such as lead zirconate titanate (PZT) or polyvinylidine difluoride (PVDF), approximately a few centimeters long, such as two cm, and of a width of a few microns are adhered in a symmetrical fashion longitudinally to each fiber near the end to be undulated. Piezoelectric materials are electrostrictive in the sense that if electrodes are attached to a strip having width, length and thickness, and a voltage, normally a high voltage of a few 1000 volts, is applied across the thickness, then they either contract or expand lengthwise. Piezoelectric materials expand or contract according to the polarity of their properties and of the voltage applied to them. FIGS. 8a and 8b show a side view of the second embodiment of the present invention, and FIG. 8c shows a cross-sectional view. In this embodiment, activation strips 18 and 18' are adhered longitudinally along and upon optical fiber 14 to be undulated. Voltage supplies 30 and 30' controlled by switches 32 and 32' supply voltage to strips 18 and 18' via positive electrodes 36 and 36' and negative electrodes 34 and 34' attached to each strip. Due to the way that the voltage supplies are connected, strip 18 is polarized opposite strip 18'. By closing switches 32 and 32', the voltage is applied to strips 18 and 18'. Accordingly, strip 18 contracts while strip 18' expands, causing fiber 14 to bend in an upward direction as shown in FIG. 8b.

Figures 9A, 9B:
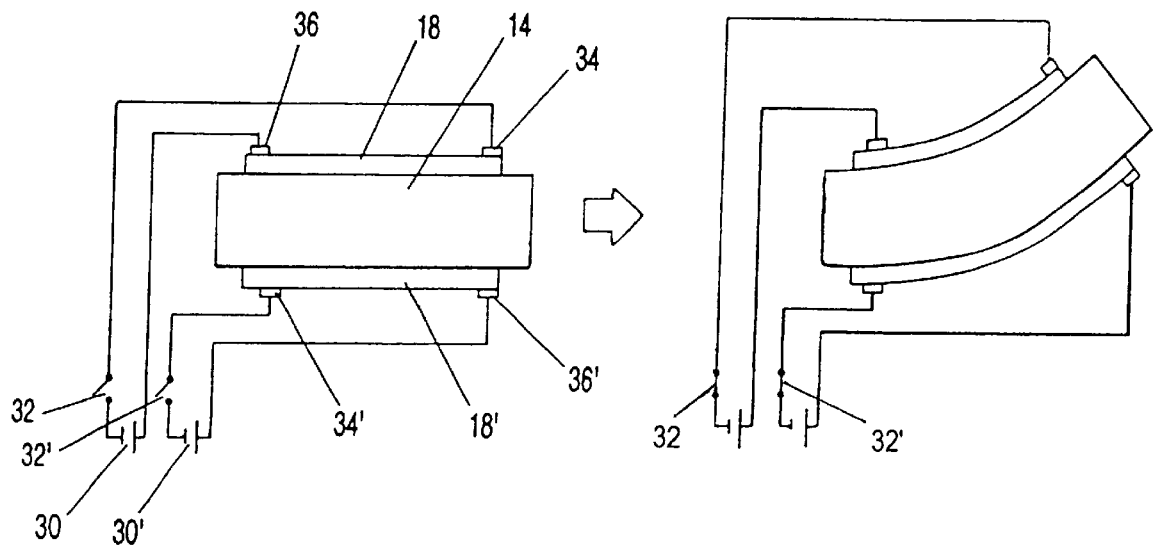
FIGS. 9a and 9b show a side view of an optical fiber having two activation strips, wherein each activation strip is activated by an electrical signal applied to two electrodes located at opposite ends of each strip, the unactivated state being shown in FIG. 9c and the activated state in FIG. 9b.
Figure 9C:
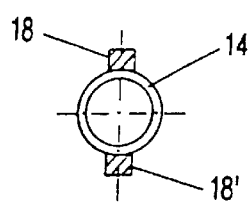
FIG. 9c is a cross-sectional view of the optical fiber with activation strips.

In a third embodiment, a plurality of shape-memory alloy wires or strips, such as Nitinol, approximately a few centimeters long, such as two centimeters, and of a width of a few microns are adhered in a symmetrical fashion longitudinally to each fiber near the end to be undulated. Shape-memory alloys either contract or expand due to a temperature transition from a solid phase of Martensite (crystalline structure is face-centered) to a solid phase of Austenite (crystalline structure is body-centered) due to direct electric Joule heating of the material. Shape-memory alloys either contract or expand according to the polarity of a voltage applied to them. By controlling the amount of voltage applied to each strip, the end of the optical fiber undulates dynamically and quickly to perform the switching function. FIGS. 9a and 9b show a side view and FIG. 9c a cross-sectional view, respectively, of the third embodiment in its simplest form. Two activation strips 18 and 18' are shown adhered 180 degrees opposite one another along the cylindrical length of optical fiber 14. Each activation strip 18 and 18' is controlled by voltage supplies 30 and 30', respectively. Switches 32 and 32' control the voltage supplied to the respective shape-memory wires. Positive electrodes 36 and 36' are attached to activation strips 18 and 18', respectively, but at opposite ends. Negative electrodes 34 and 34' are attached at opposite ends from positive electrodes 36 and 36' to activation strips 18 and 18'. As demonstrated in FIG. 9b, by closing switches 32 and 32', voltage is applied to activation strips 18 and 18' causing strip 18 to contract and strip 18' to expand. This is due to the fact that the voltage polarities across the two shape-memory strips are opposite. Because activation strip 18 contracts and activation strip 18' expands, and they are both directly adhered to optical fiber 14, optical fiber 14 bends in an upward direction as shown in FIG. 9b. Reversing the polarities of the voltages applied to strips 18 and 18' will cause the fiber to bend downward instead.

In addition to the materials discussed above for activation purposes, a special material called ionic polymeric metal composite (IPMC) artificial muscles can be used for the activation means. This material is disclosed in U.S. Pat. No. 6,109,852, to Mohsen Shahinpoor and Mehran Mojarrad, entitled "Soft Actuators and Artificial Muscles," and U.S. patent application Ser. No. 09/258,602, also to Mohsen Shahinpoor and Mehran Mojarrad, entitled "Ionic Polymer Sensors and Actuators," and the disclosures therein are herein incorporated by reference. See also M. Shahinpoor, Y. Bar-Cohen, J. Simpson and J. Smith, "Ionic Polymeric Metal Composites (IPMC) as Biomimetic Sensors, Actuators and Artificial Muscles—A Review," *J. Smart Materials & Structure*, Vol. 7, No. 4, pp. R15-R36, 1998, also incorporated herein by reference. This material may be advantageous by being more compatible with optical fiber material and more easily attachable or incorporated into fiber optic devices. The optical fiber can be entirely built from these electro- or magneto-active plastic materials which are essentially transparent before activation. When entirely built from IPMC artificial muscle, the material is cladded to have internal reflection and is coated with electrodes to cause the optical channel to undulate in 2½ dimensions when the material is activated via the electrodes.

In a fourth embodiment, a plurality of ionic polymeric metal composite, IPMC artificial muscle, activation strips approximately a few centimeters long, such as two cm, and of a width of a few microns are adhered in a symmetrical fashion longitudinally to each fiber near the end to be undulated. Artificial muscles in the form of strips with electrodes sputtered or plated on their surfaces across their thickness, naturally bend when subjected to a low voltage of a few volts, such as 2–5 volts, and amperages of approximately a few hundred milliamps. By "natural bending," one side contracts and one side expands, in distinction to magneto-strictive, piezoelectric, piezoceramic, piezo-polymeric or shape-memory materials, which expand or contract more or less uniformly. The underlying theory is that ions within the material migrate to one side or the other and in doing so carry water with them causing swelling on one side (expansion) and deswelling on the other side (contraction). The strips, which either bend inward or outward, i.e., concave or convex, are powered by a pair of wires to a voltage supply connected to electrodes on the strips and can enable the optical fiber to undulate dynamically and quickly to perform the switching function. Upon applying voltage to the electrodes on the IPMC artificial muscle activation strips, the strips themselves bend either inward or outward direction. Therefore, a plurality of these strips can be adhered to the fiber for a finer degree of control in 2½in much the same manner as described above with respect to piezoelectrics and shape-memory alloys.

In a fifth embodiment, an appropriately electroded sleeve or tubular jacket of ionic polymeric conductor composite, IPMC artificial muscle, approximately a few centimeters long, such as two cm, and of a thickness of a few microns is adhered on the cylindrical mantle of each fiber near the free end to be undulated in the same manner as described and shown with FIG. 10 above. Although FIG. 10 was used for purposes of illustrating a magneto-strictive material jacket, the operation of the IPMC artificial muscle jacket is the same. When voltage 30 is supplied to electrodes 34 and 36 upon IPMC jacket 50 through switch 32, jacket 50 as a whole bends in an upward direction as shown in FIG. 10b. FIG. 10 is only for purposes of demonstrating an exemplary motion of fiber 14. Electrode pairs can be attached at various locations upon jacket 50 to cause it to bend in other directions as well.

In a sixth embodiment, the optical fiber is made entirely from IPMC muscle and is cladded appropriately to have internal reflection and coated appropriately with electrodes on the outside to allow activation for dynamic 2½undulation in any optical fiber switching action.

In a seventh embodiment, one or more activation strips may be attached to a fiber in the form of a bimorph. A bimorph strip consists of a twin-layer strip that is properly equipped with electrodes such that when a voltage is applied, one layer contracts while the other layer expands, thereby causing the bimorph to bend and concurrently causing the fiber to which it is attached to bend. The bimorph can comprise a piezoelectric material.

Of course, any optical channel, be it an optical fiber, a group of fibers, or a fiber optic cable, can be moved in the same manners as described above. Also, it is to be understood that the fiber can be moved using combinations of the various activation strip materials described above. The activation strips are to be affixed to the input or output optical channels in accordance with the application for the switch. While only one direction of motion is shown in FIGS. 8–10, and a particular arrangement of electrodes and polarities is shown, it is to be understood that any direction of movement can be accomplished by varying the locations of the activation strip or strips, polarities, and number of strips. In all of the embodiments presented, the electrical source applied to the activation strips need not be a constant source, but can of course be a variable source such as a variable voltage waveform that varies in either frequency, amplitude, or polarity, or any combination of those three so as to control the undulation frequency, direction, and amplitude of the optical channel.

Figures 11A, 11B:
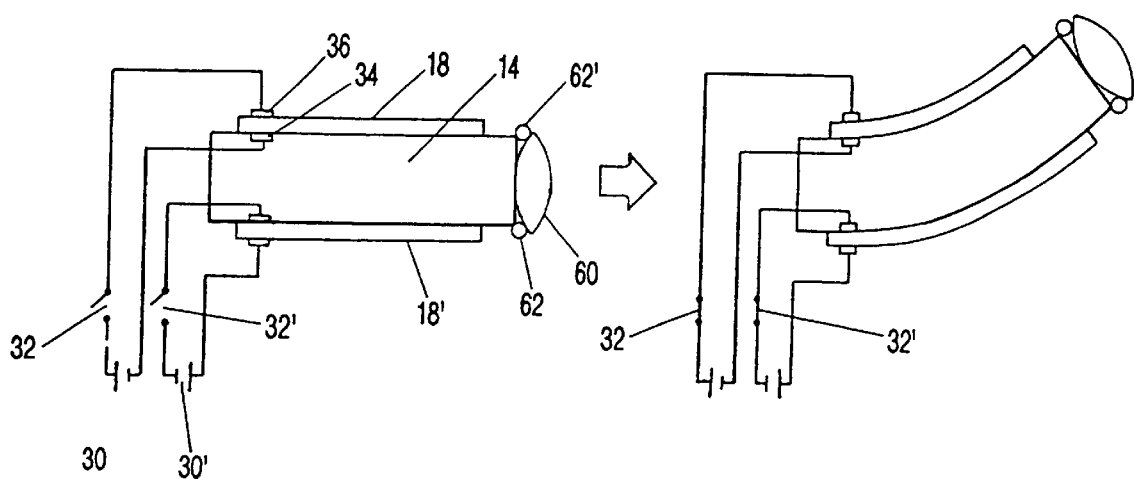
FIGS. 11a and 11b show a side view of the activation strip configuration of FIG. 8 further including a collimating lens at the output face of the fiber.

In an alternative embodiment, collimating lenses are affixed to the input and/or output fibers so that the sending and receiving fiber faces need not be in extremely close proximity, thereby increasing the flexibility of the switch. FIG. 11 shows the activation strip configuration of FIG. 8 with the addition of collimating lens 60. Collimating lens 60 is affixed to the output end of fiber 14 with bonding bridges shown generally at 62 and 62' to aid in focusing the light signal sent from or received into fiber 14. Lens 60 is used to concentrate the emission of the light signal that naturally diverges upon exiting a fiber.

Figure 12:
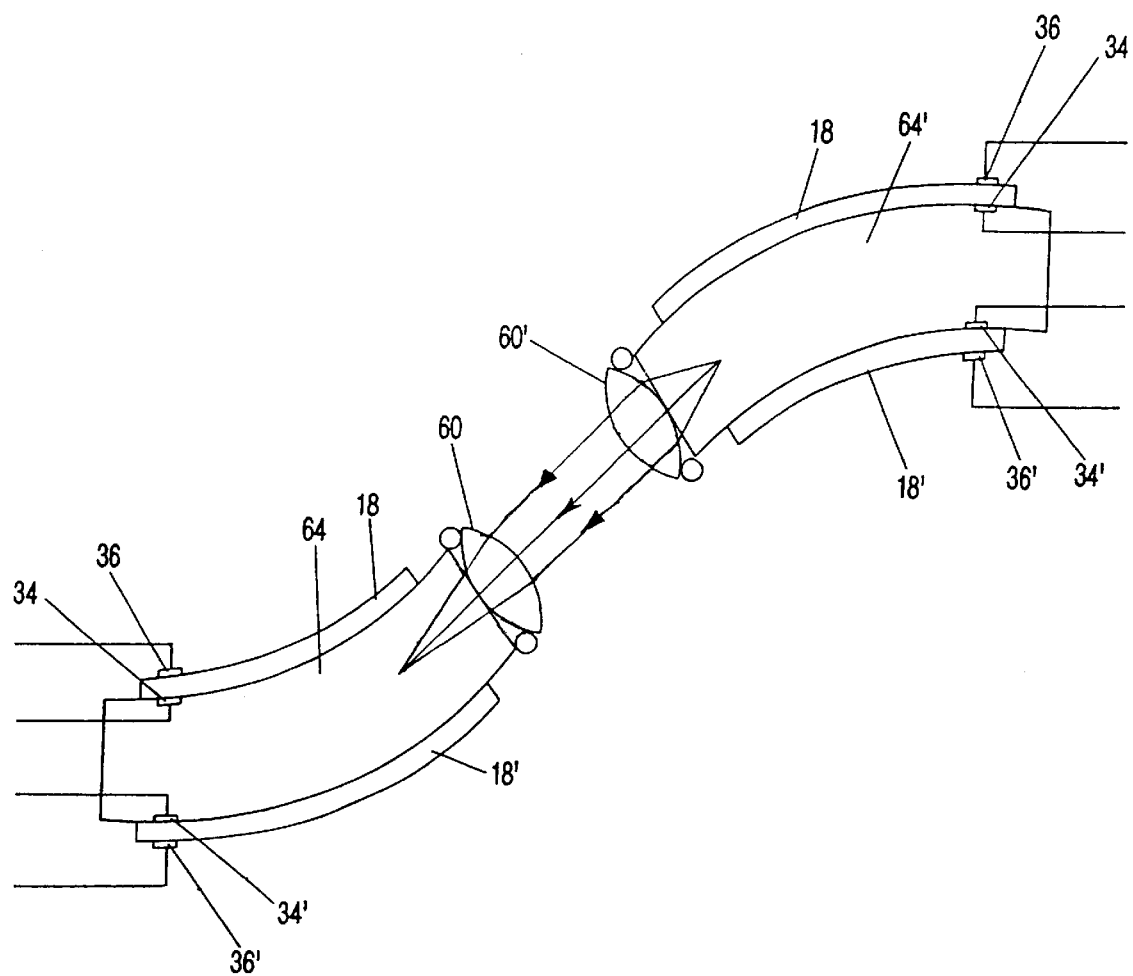
FIG. 12 is a side view of input and output optical fibers undulating in response to an electrical signal applied to the activation strips upon each such that the two fiber ends move toward one another and the signal is transmitted from one to the other.

Turning to FIG. 12, input fiber 64' is shown sending the signal to receiving or output fiber 64. In this configuration both fibers 64 and 64' are provided with collimating lenses 60 and 60'. Collimating lenses are not required if the faces of the two fibers are in such close proximity that the light signal does not have sufficient distance to diverge significantly and instead remains focused enough to enter the adjacent fiber. However, in the configuration demonstrated in FIG. 12 the light beam diverges due to the distance between the opposing fiber faces and lenses 60 and 60' are used to focus and capture the light signal sent and received. The proper choice of lenses causes the light beam to be narrow and cylindrical so as to be sent and received properly. Collimating lenses are not required on both the input and output fibers, but can instead be included on either input fiber 64' or output fiber 64 depending upon the desired amount and control of the collimation. Lenses 60 and 60' are concave, convex, or whatever shape necessary to provide the numerical aperture and focal point required to accommodate the distance between the input and output fiber faces and optimize transmission of the signal.

Figure 13:
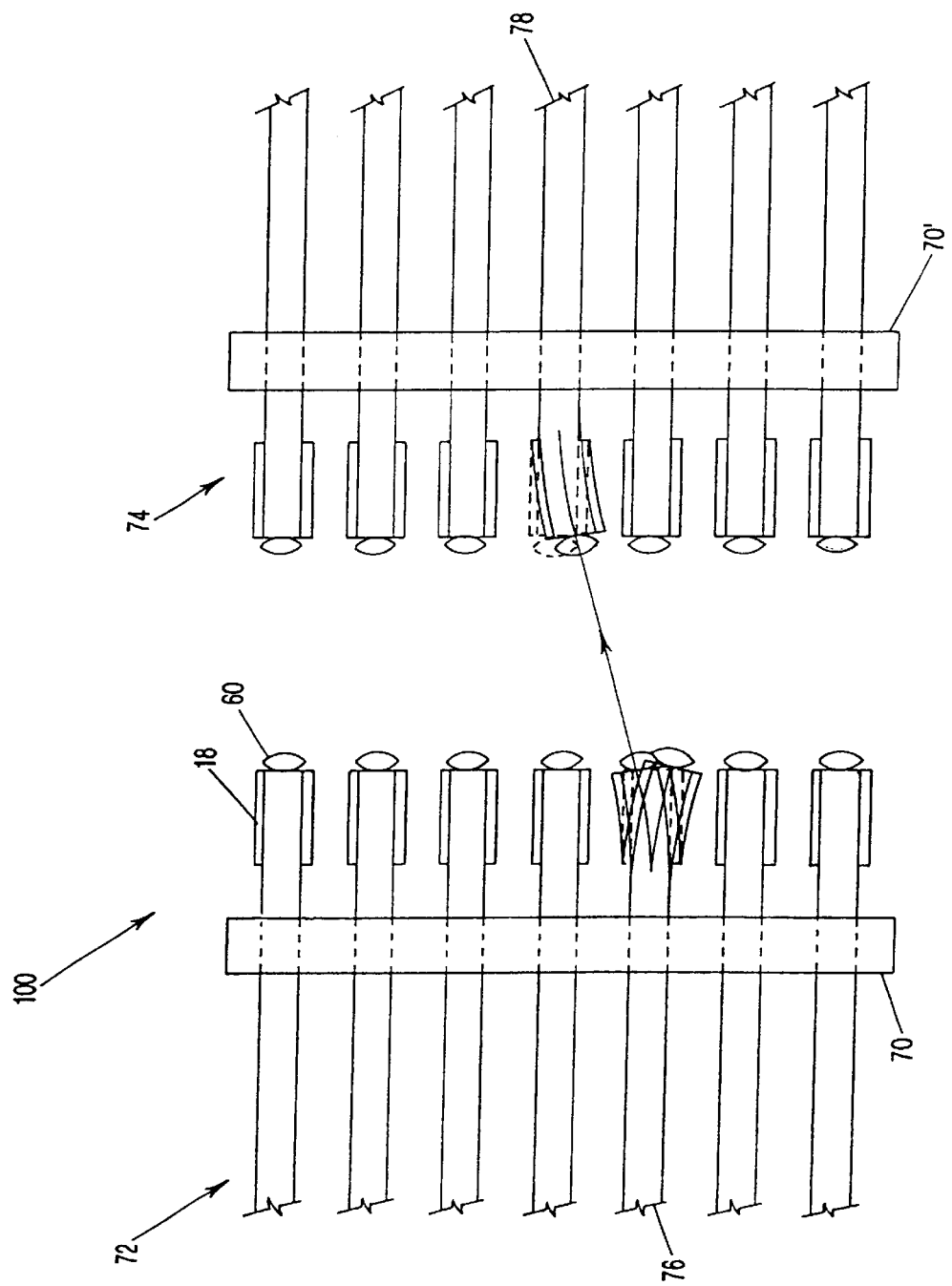
FIG. 13 is a side view of the preferred embodiment of the present invention showing a group of input and a group of output fibers showing a particular input and a particular output fiber undulating toward one another by means of activation strips so that the signal from the input fiber is sent to the output fiber; collimating lenses are also shown for focusing the light from the input to the output fiber.

Turning to FIG. 13, the preferred embodiment of the present invention is shown. FIG. 13 shows a side view of a multichannel switching system 100 is shown where the faces of a plurality of input fibers 72 (or fiber bundle) and a plurality of output fibers 74 (or fiber bundle) are in an end-to-end or opposing relationship and signals are sent from a selected input fiber to a selected output fiber. In FIG. 13, input fibers 72 and output fibers 74 all have activation strips 18 adhered to each fiber. Again, while two activation strips can be seen on each fiber, any number of activation strips can be adhered to each fiber as necessary for the degree of control required.

As an example, input fiber 76 and output fiber 78 are shown undulating toward one another by means of the activation strips so that the light signal exiting from fiber 76 is directed into fiber 78. Collimating lenses 60 aid in focusing the light signal due to the distance between input fibers 72 and output fibers 74. As discussed above, collimating lenses may not be required at all, or may not be required on both input and output fibers, but are used as needed depending upon the distance between input and output fibers and the collimation required for optimal transmission of the signal. If data is to be sent in either direction through multichannel fiber optic switch 100, the collimating lenses are preferably attached to all of the fiber end faces of all of the input and output fiber bundles. If the switch transmits in only one direction, collimating lenses are preferably provided on each of the faces of the emitting fibers. Output, or receiving fibers have a conical viewing geometry so that the cone angle of the receiving fibers need only cover the entire end of the emitting bundle. This routing switch, therefore, is capable of including many hundreds of channels in its routing capability without necessarily having to flex the receiving fibers.

Figure 15B:
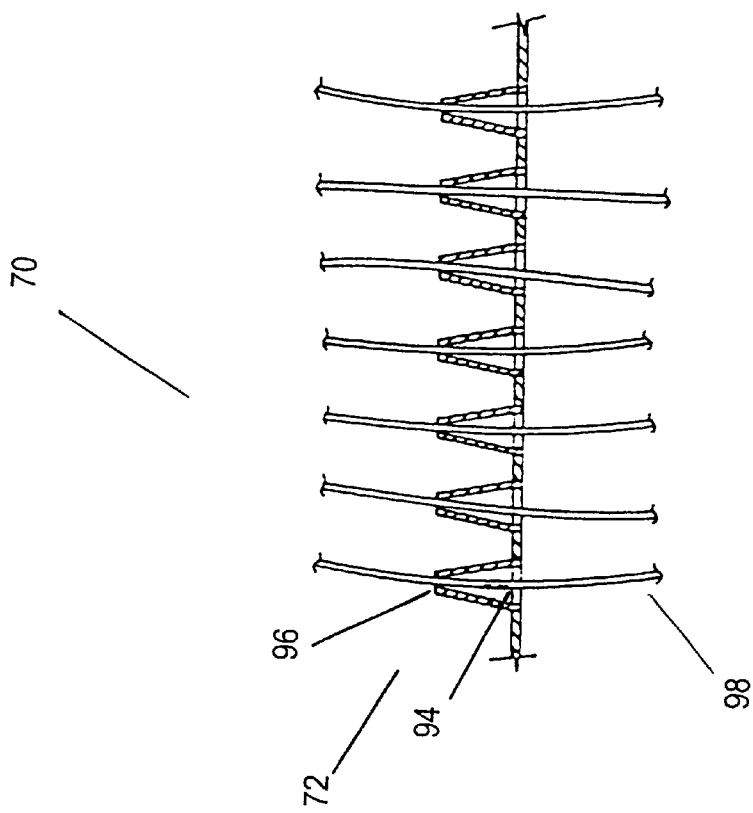
FIGS. 15a and 15b are a front and cross sectional view, respectively, of the support frame used in accordance with the present invention.
Figure 15A:
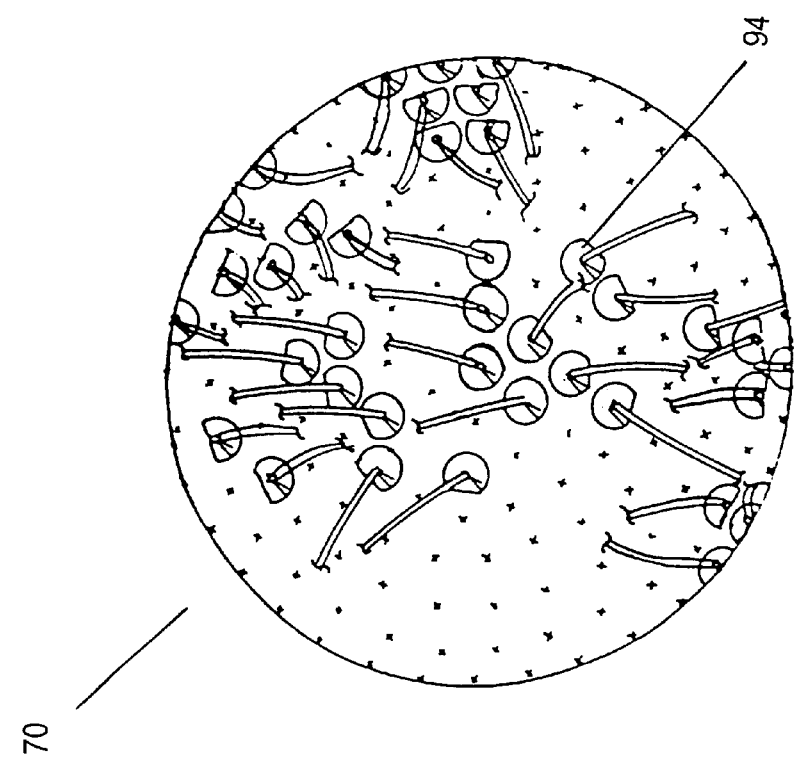

Input fibers 72 are held by support frame 70 and output fibers 74 are held by support frame 70' in order to stabilize and arrange the fibers so that the free ends can move in response to the electrical signals applied to the activation strips. Attention is briefly turned to FIG. 15a which shows a front view and FIG. 15b a cross-sectional view of support frame 70. Frame 70 grasps fibers 72 behind the activation strips at 96 via an array of conical or pyramidal shaped openings 94 in frame 70 that the fibers fit through, thus allowing each fiber to flex in the area shown at 98, up to a maximum angle; this angle being determined by the distance and spatial relationship between the two bundles of input and output fibers, the location of the individual fiber in its bundle, and the viewing pattern boundary of the opposite bundle. Openings 94 are therefore shown as cones and cone segments to allow for the necessary angle and amount of flexure for each fiber based upon that fiber's position in the fiber bundle.

For example, an input or signal-emitting fiber near the circumferential edge of its bundle (assuming a cylindrical bundle of fibers) must send a beam of light straight ahead to reach a fiber at the corresponding location in the output bundle, but to reach a fiber located at the opposite edge (of a diameter) of the opposite bundle, the emitting fiber must have a maximum angle of flexure radially inward. Further, an emitting fiber centrally located in its bundle, however, must be able to flex bilaterally if it is to direct the signal to fibers located anywhere in the area of the opposing bundle's face. The openings 94 in frames 70 and 70' containing the individual fibers are shaped accordingly, for example being shaped as conical or pyramidal segments, to accommodate whatever degree of flexure is required of the individual fibers of both the input and output fiber bundles.

Figure 14:
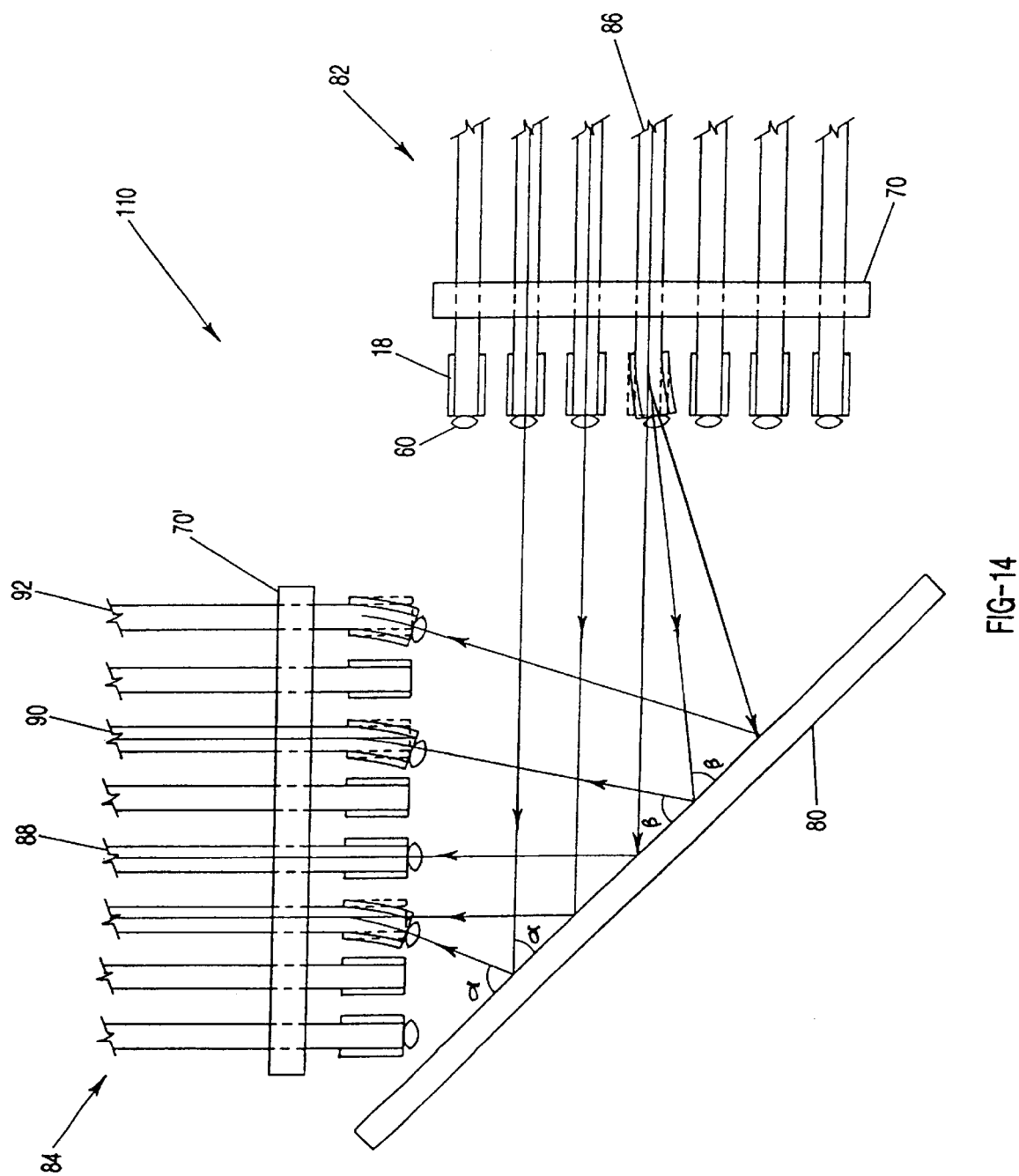
FIG. 14 is a side view of a group of input and a group of output fibers arranged approximately perpendicular to each other and including a mirror, the arrangement demonstrating the use of the mirror in addition to the collimating lenses and activation strips for directing input fiber signals to the appropriate output fiber.

FIG. 14 shows an alternative embodiment 110 for the multichannel switching system of FIG. 13 wherein a plurality of input fibers 82 are arranged at an angle, in this case approximately ninety degrees, from a plurality of output fibers 84. This configuration can occur when due to space or location constraints it is not possible for the input and output fibers to be in an opposing relationship to one another. Each fiber has activation strips 18 adhered to the fiber to undulate the free end of the fiber, and a collimating lens 60 for focusing the light signal, as needed (see above discussion regarding lenses). Input fibers 82 are held by support frame 70 and output fibers 84 are held by support frame 70' in order to stabilize and arrange the fibers so that the free ends can move in response to the electrical signals applied to the activation strips as described above. As above, the number of activation strips used on the fibers and the location thereon can vary from one application to the next. Also, collimating lenses 60 may or may not be required on all fibers as needed. In this configuration, mirror 80 is provided to aid in directing the light signals from input fibers 82 to output fibers 84 because the faces of input fibers 82 and output fibers 84 are not in an opposing relationship. The angle of reflection off of mirror 80 for each light signal is equal to the angle of incidence onto mirror 80 as indicated by $\alpha$ and $\beta$. Mirror 80 is shown as planar, however, it can alternatively be concave or convex as will be apparent to those skilled in the art, in order to converge or diverge the reflected light signals as desired.

As an example of how system 110 operates, fiber 86 is shown in three different positions so that the light from input fiber 86 is sent to one of three different output fibers 88, 90, and 92 depending upon which of the three positions fiber 86 occupies. In the horizontal position fiber 86 emits light that is reflected off of mirror 80 and into output fiber 88 which is not required to undulate in order to capture the signal from fiber 86. In response to a signal received by the activation strips located upon fiber 86, fiber 86 undulates to a second position where the emitted signal reflects off of mirror 80 and into fiber 90 which has also undulated by means of its activation strips in order to receive the signal from fiber 86. When fiber 86 moves to a third position by way of its activation strips, the emitted light reflects off of mirror 80 and into fiber 92 that has also moved in response to signals received by its activation strips.

The present invention may be used in telecommunications for signal on-off control; signal routing from one destination to another; signal attenuation; signal combination by having two or more outgoing bundles from two or more sources to be formed into a single bundle; and signal splitting to send a signal to more than one destination. The invention may be located at either the transmitting or receiving terminals of a communication channel or any intermediate location. The functioning bandwidth of the switching time spans a fraction of a Hertz to an upper limit of a few kilohertz.

The activation strips for the fibers are preferably computer controlled. Computer software directs each input or emitting fiber to select the proper output or receiving fiber of the receiving bundle. It then positions the emitting fiber, the receiving fiber, or both, at the proper angle through control of the activation strips. The data stream of the incoming channel includes both the message information and the software instructions for each message.

The present invention provides fiber optic switching that controls the routing of many hundreds of data channels in a very inexpensive, reliable, simple, and dependable way which is readily amenable to mass production.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical switch comprising an input comprising at least one input optical channel; an output comprising at least one output optical channel; and a plurality of individual activation strips adhered to and arranged longitudinally and symmetrically around an end of each of said input channel to cause said channel to undulate in 2½ dimensions and align with the desired output optical channel when said activation strips are activated.

2. The switch of claim 1 wherein said activation strips are activated with a source that varies in at least one of amplitude, frequency, or polarity.

3. The switch of claim 1 wherein said activation strips comprise at least one material selected from the group consisting of magneto-strictive material, piezoelectric material, piezoceramic material, piezo-polymeric material, shape-memory alloy material, and artificial muscle material.

4. A method of switching an optical channel, the method comprising the steps of adhering and arranging a plurality of individual activation strips longitudinally and symmetrically around an end of an optical channel and activating the strips to cause the channel to undulate in 2½ dimensions and align with a desired output optical channel.

5. The method of claim 4 wherein the step of activating the strips comprises activating with a source that varies in at least one of amplitude, frequency, or polarity.

6. The method of claim 4 wherein the step of adhering and arranging the strips comprises:

providing an input optical channel having a first end and a second end, wherein the activation strips are adhered longitudinally on the first end;

providing at least two output optical channels arrayed within 2½ dimensions of the first end of the input optical channel; and wherein the step of activating the strips comprises:

activating the strips to cause the first end of the input optical channel to undulate in 2½ dimensions to align with one of the at least two output optical channels.

7. The method of claim 5 wherein adhering and arranging activation strips comprises adhering at least one material selected from the group consisting of magneto-strictive material, piezoelectric material, piezoceramic material, piezo-polymeric material, shape-memory alloy material, and artificial muscle material, around an optical channel.

8. An optical switch for directing the signals emitted from input optical channels into selected output optical channels, said switch comprising a plurality of individual activation strips adhered and arranged longitudinally around an end of each of the input and output optical channels to cause the channels to undulate in 2½ dimensions in response to activation signals received by said activation strips.

9. The switch of claim 8 wherein said activation strips are adhered longitudinally on free ends of the optical channels.

10. The switch of claim 8 wherein said activation strips are activated with a source that varies in at least one of amplitude, frequency, or polarity.

11. The switch of claim 8 wherein said activation strips comprise at least one material selected from the group consisting of magneto-strictive material, piezoelectric material, piezoceramic material, piezo-polymeric material, shape-memory alloy material, and artificial muscle material.

12. The switch of claim 8 further comprising collimating lenses located upon the sending faces of the input channels for focusing the emitted signal from the input channels into the selected output channels.

13. The switch of claim 8 further comprising collimating lenses located upon the sending faces of the input channels and receiving faces of the output channels for focusing the emitted signal from the input channels into the selected output channels.

14. The switch of claims further comprising a mirror for reflecting the emitted signals from the input channels toward the output channels.

15. The switch of claim 8 wherein said plurality of activation strips comprises at least three activation strips arranged symmetrically upon the channels.

16. The switch of claim 15 wherein said at least three activation strips comprise four activation strips, and wherein two of said four activation strips are oppositely polarized and located approximately 180 degrees opposite one another, and the remaining two are oppositely polarized and located approximately 180 degrees opposite one another and orthogonal to the first two.

17. The switch of claim 8 further comprising at least one support frame for stabilizing at least one of the group consisting of the input channels and the output channels, said support frame defining a plurality of openings for each of the channels to fit through such that each of the channels has a free end on which said activation strips are located and a fixed portion held fixed by said frame.

18. The switch of claim 17 wherein said openings within said frame comprise at least one three-dimensional shape selected from the group consisting of a cone, a pyramid, a conical segment, and a pyramidal segment.

19. A method of optical switching for directing the signals emitted from input optical channels into selected output optical channels, the method comprising the steps of:

adhering and arranging a plurality of individual activation strips longitudinally around an end of each of the input and output optical channels;

applying an activation signal to the activation strips; and undulating the channels in 2½ dimensions in response to the activation signals received by the activation strips.

20. The method of claim 19 wherein adhering and arranging activation strips comprises adhering the activation strips longitudinally on free ends of the optical channels.

21. The method of claim 19 wherein applying an activation signal comprises varying the signal in at least one of amplitude, frequency, or polarity.

22. The method of claim 19 wherein adhering and arranging activation strips comprises adhering at least one material selected from the group consisting of magneto-strictive material, piezoelectric material, piezoceramic material, piezo-polymeric material, shape-memory alloy material, and artificial muscle material.

23. The method of claim 19 further comprising the step of focusing the emitted signal from the input channels into the selected output channels with collimating lenses affixed to the sending faces of the input channels.

24. The method of claim 19 further comprising the step of focusing the emitted signal from the input channels into the selected output channels with collimating lenses affixed to the sending faces of the input channels and the receiving faces of the output channels.

25. The method of claim 19 further comprising the step of reflecting the emitted signals from the input channels toward the output channels with a mirror.

26. The method of claim 19 wherein adhering and arranging a plurality of activation strips comprises adhering at least three activation strips symmetrically on the channels.

27. The method of claim 19 further comprising the steps of:

stabilizing at least one of the group consisting of the input channels and the output channels with at least one support frame;

defining a plurality of openings with the support frame; and fitting each of the channels through the openings of the support frame such that each channel has a free end on which the activation strips are located and a fixed portion held fixed by the frame.

28. The method of claim 27 wherein defining a plurality of openings comprises defining openings of at least one three-dimensional shape selected from the group consisting of a cone, a pyramid, a conical segment, and a pyramidal segment.

29. An optical switch for directing the signals emitted from input optical channels into selected output optical channels, said switch comprising:

a plurality of individual activation strips adhered and arranged longitudinally on free ends of each of the input and output optical channels to cause the channels to undulate in 2½ dimensions in response to activation signals received by said activation strips causing the free ends of selected of the input and output channels to move toward one another;

collimating lenses located on at least one of the emitting and receiving faces of the input and output optical channels for focusing the emitted signals from the input channels into the output channels; and a support frame for stabilizing the input channels and a support frame for stabilizing the output channels, each of said support frames defining a plurality of openings for each of the channels to fit through such that each channel has a free end on which said activation strips are located and a fixed portion held fixed by said frame.

* * * * *